United States Patent [19]

Nakayama et al.

[11] Patent Number: 5,391,022
[45] Date of Patent: Feb. 21, 1995

[54] CUTTING TOOL

[75] Inventors: Masaaki Nakayama; Masayuki Okawa; Junichi Saito, all of Ibaraki, Japan

[73] Assignee: Mitsubishi Materials Corporation, Tokyo, Japan

[21] Appl. No.: 215,578

[22] Filed: Mar. 22, 1994

Related U.S. Application Data

[62] Division of Ser. No. 851,204, Mar. 13, 1992, Pat. No. 5,314,273.

[30] Foreign Application Priority Data

Mar. 13, 1991 [JP] Japan .................................. 3-48462
Mar. 20, 1991 [JP] Japan .................................. 3-16925

[51] Int. Cl.6 ............................................. B23B 51/00
[52] U.S. Cl. ................................. 408/233; 279/8; 279/83; 408/239 A
[58] Field of Search .............. 408/181, 199, 200, 231, 408/233, 239 A, 238, 239 R; 409/234, 232; 279/8, 83; 407/53, 54

[56] References Cited

U.S. PATENT DOCUMENTS

| 1,985,817 | 5/1934 | Gase . |
| 2,167,014 | 7/1939 | Verderber . |
| 2,293,680 | 8/1942 | Beyreis . |
| 2,435,396 | 2/1948 | Koch . |
| 2,461,579 | 2/1949 | Thomas . |
| 3,344,690 | 10/1967 | Proksa . |
| 4,666,353 | 5/1987 | Micek . |
| 4,784,542 | 11/1988 | Tack et al. . |
| 4,871,286 | 10/1989 | Hunt . |
| 4,877,360 | 10/1989 | Pfalzgraf . |
| 5,040,932 | 8/1991 | Oshnock ........................ 279/83 |
| 5,143,495 | 9/1992 | Bosek . |

FOREIGN PATENT DOCUMENTS

| 2376 | 7/1899 | Denmark . |
| 15248 | 9/1980 | European Pat. Off. ............ 279/83 |
| 0138336 | 4/1985 | European Pat. Off. . |
| 0187469 | 7/1986 | European Pat. Off. . |
| 366047 | 5/1990 | European Pat. Off. . |
| 792786 | 1/1936 | France . |
| 2590819 | 6/1987 | France ............................. 409/234 |
| 256466 | 5/1988 | German Dem. Rep. ............ 409/234 |
| 0160545 | 6/1904 | Germany . |
| 2262850 | 6/1974 | Germany . |
| 3131478 | 2/1983 | Germany . |
| 8633959 | 5/1988 | Germany . |
| 57-178605 | 11/1982 | Japan . |
| 58-160003 | 9/1983 | Japan . |
| 7800009 | 8/1979 | Sweden ............................ 409/234 |
| 599820 | 5/1978 | Switzerland . |
| 2099904 | 12/1982 | United Kingdom . |

*Primary Examiner*—Daniel W. Howell
*Attorney, Agent, or Firm*—Cushman, Darby & Cushman

[57] ABSTRACT

The present invention relates to a cutting tool, especially the cutting tool having a head segment releasably attached to a shank segment. According to one aspect of this invention there is provided a cutting tool comprising: (i) a head segment rotatable around an axis thereof and a forward end portion having at least one cutting-insert receiving seat and a rearward end portion; (ii) a shank segment rotatable around an axis thereof having a forward end portion adapted to be coaxially joined with the rearward end of the head segment and a rearward end portion adapted to be fixedly secured to a machine spindle; (iii) an engaging hole coaxially formed on one of the above segments, which is provided with at least two internal threads communicating between the hole and the external surroundings through a peripheral surface of the segment; (iv) an engaging projection coaxially formed on other one of the segments and engagingly fitted into the hole; and (v) clamp screws respectively threaded through each internal thread, in which bottom ends of the clamp screws are contacted with a surface of the engaging projection.

9 Claims, 7 Drawing Sheets

1

CUTTING TOOL

This is a division of application Ser. No. 07/851,204, filed Mar. 13, 1992, now U.S. Pat. No. 5,314,273.

BACKGROUND OF THE INVENTION

1. Field of the Invention

The present invention relates to a cutting tool comprising a head segment and a shank segment, especially a cutting tool has a feature that the head segment releasable from the shank segment.

2. Related Art

FIGS. 25 and 26 show a conventional cutting tool which has a generally cylindrical cutting tool body 10 having a shank segment 11 and a head segment 12. The shank segment 11 is adapted to be fixedly secured to a machine spindle (not shown) so that the cutting tool body 10 can be rotated about an axis passing thereof. The shank segment 11 is made of a high-rigid material such as a cemented carbide alloy which can be used for preventing deflection or chatter vibration of the body 10.

The head segment 12 has a generally hemispherical forward end and a rearward end and is made of an easy-processing material such as a steel. In general, at least one insert receiving recess is formed in the forward end of the head segment 12, in which a cutting insert 3 is fixed by a clamp screw 4, while the reward end of the head segment 12 is joined with the shank segment 11 at a joint portion 13 by means of brazing.

However, the conventional cutting tool described above has some problems:

(i) it is difficult to detach the head segment from the shank segment because they are joined each other by the braze as mentioned above, so that the head segment can hardly be exchanged for another one when the head segment is damaged or when a different type of the head segment is required;

(ii) it is also difficult to bring the end face of the head segment in contact with the end face of the shaft segment with a required accuracy, so that the head segment and/or shank segments requires at least one positioning marker or positioning mechanisms.

FIG. 27 shows another type of a conventional cutting tool which is fabricated for solving the above problem (i). As shown in the figure, an external thread 17 is coaxially provided with the shank segment 14, while an internal thread (not shown) is coaxially formed on the head segment 15. Consequently, these segments 14 and 15 are joined by threads so that the head segment can be easily replaced with another one.

In this case, however, the internal and external threads have their own tolerances so that it is difficult to adjust the relative position between the head 15 and the shank 14 in a circumferential direction. For example, it is difficult to adjust the relative circumferential position between a cutting insert 3 and a chamfered corner 16 of the shank 14 when the head 15 and the shank 14 are tightened with the external thread 17. Accordingly, the above described joining means cannot be used for the work rotating cutting method but can be used for the tool-rotating cutting method.

Furthermore, it is difficult to fabricate the external thread in a unitary construction with the shank when the shank is made of a cemented carbide alloy. In addition, in the case that an external thread segment is manufactured from an easy-processing material such as steels and joined with the shank segment by means of brazing, additional processing steps or the like would be required, resulting in the complicated fabricating process of the cutting tool.

SUMMARY OF THE INVENTION

According to one aspect of this invention there is provided a cutting tool comprising: (i) a head segment rotatable around an axis thereof having a forward end portion having at least one cutting-insert receiving seat, and a rearward end portion; (ii) a shank segment rotatable around an axis thereof having a forward end portion adapted to be coaxially joined with the rearward end of the head segment and a rearward end portion adapted to be fixedly secured to a machine spindle; (iii) an engaging hole coaxially formed on one of the above segments, which is provided with at least two internal threads communicating between the hole and the external surroundings through a peripheral surface of the segment; (iv) an engaging projection coaxially formed on other one of said segments and engagingly fitted into the hole; and (v) clamp screws respectively threaded through each internal thread, in which bottom ends of the clamp screws are contacted with a surface of the engaging projection.

In a preferred embodiment of the first aspect of the invention, the shank segment is provided with the engaging projection and is made of a cemented carbide alloy. In this case, it is preferable that the shank segment and the engaging projection are fabricated in a unitary construction.

In a modified embodiment of the first aspect of the invention, the internal threads are formed so as to coaxially coincide with each other.

In another modified embodiment of the first aspect of the invention, the engaging projection further including flat portions on its peripheral surface for receiving the bottom ends of the clamp screws, respectively.

According to another aspect of this invention there is provided a cutting tool comprising: (i) a head segment rotatable around an axis thereof and a forward end portion having at least one cutting-insert receiving seat and a rearward end portion; (ii) a shank segment rotatable around an axis thereof having a forward end portion adapted to be coaxially joined with the rearward end of the head and a rearward end portion adapted to be fixedly secured to a machine spindle; (iii) an engaging tapered hole coaxially formed on one of said segments; and an engaging tapered projection in the form of a general conical frustum coaxially formed on other one of the segments and engagingly fitted into said hole.

In a preferred embodiment of the second aspect of the invention, the shank is provided with the engaging projection and is made of a cemented carbide. In this case, it is preferable that the shank segment and the engaging projection are fabricated in a unitary construction.

In a modified embodiment of the second aspect of the invention, the cutting tool further comprises means of immobilizing the projection in the hole so as to ensure that relative position of the projection and the hole is maintained. In this case, it is preferable that the above immobilizing means includes: at least one internal thread communicating between the hole and the external surroundings through a peripheral surface of the segment; and at least one clamp screw respectively threaded through the internal thread, in which a bottom end of the clamp screw is contacted with a surface of the engaging projection.

In another modified embodiment of the second aspect of the invention, the engaging projection further includes a flat portion on its peripheral surface thereof for receiving the bottom end of the clamp screw.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings.

DETAILED DESCRIPTION OF THE PREFERRED EMBODIMENT

Figure 1:
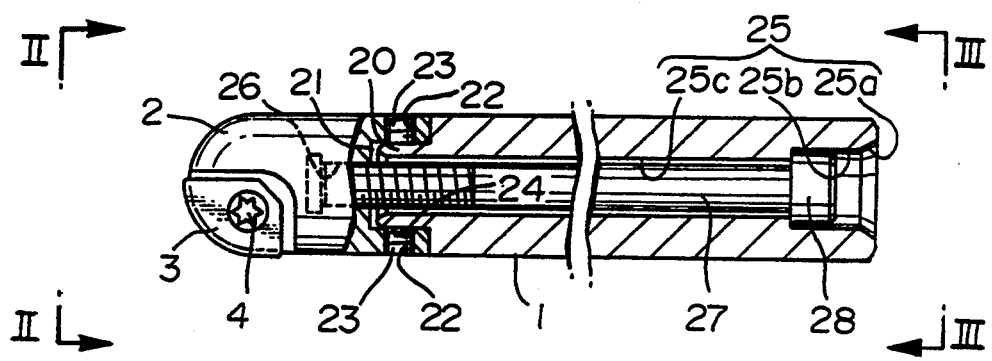
FIG. 1 is a front partial sectional view of a cutting tool in accordance with the first aspect of the present invention.
Figure 2:
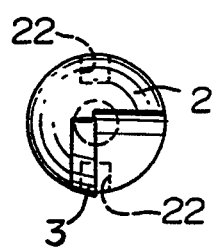
FIG. 2 is an end view of the cutting tool of FIG. 1 as seen in the direction indicated by the arrows II—II in FIG. 1.
Figure 3:
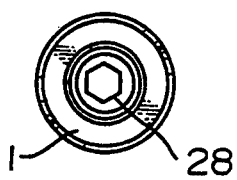
FIG. 3 is another end view of the cutting tool of FIG. 1 as seen in the direction indicated by the arrows III—III in FIG. 1.
Figure 4:
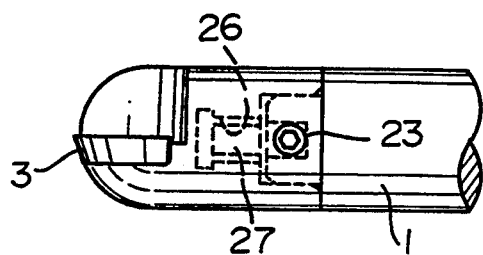
FIG. 4 is a front view of a part of the cutting tool of FIG. 1.

Various embodiments of the present invention will be described hereinafter with reference to the accompanying drawings in which the same reference characters are used to designate like parts or elements in several views.

EXAMPLE 1

FIGS. 1 to 6 depict a ball end mill in accordance with the present invention comprising a shank segment 1 and a head segment 2.

The shank segment 1 has two end portions: a forward end portion coaxially provided with an engaging projection 20 adapted to be joined with the head segment 2; and a rearward end portion which is adapted to be fixedly secured to a machine spindle (not shown).

In this example, the shank segment 1 also comprises a through hole 25 which is coaxially formed in the shank 1 and the engaging projection 20, and thus the through hole 25 is opened at the rearward end face of the shank segment 1 and a forward end face of the engaging projection 20 so that a clamp bolt 27 is inserted from an opening at the rearward end of the shank segment 1 and is penetrated through the engaging projection 20.

As shown in FIG. 1, the through hole 25 comprises three parts:

a tapered opening protion 25a at a side of the rearward end of the shank segment 1, which is responsible for a step of inserting the clamp bolt 27 into the through hole 25;

a bolt-head receiving portion 25b, which is responsible for holding a head 28 of the clamp bolt 27; and a reduced diameter portion 25c which is formed such that its inner diameter is slightly larger than the outer diameter of a threaded portion of the clamp bolt 27.

In addition, the shank segment 1 and the engaging projection 20 are fabricated in a unitary construction by using a material of cemented carbide alloy.

Figure 5:
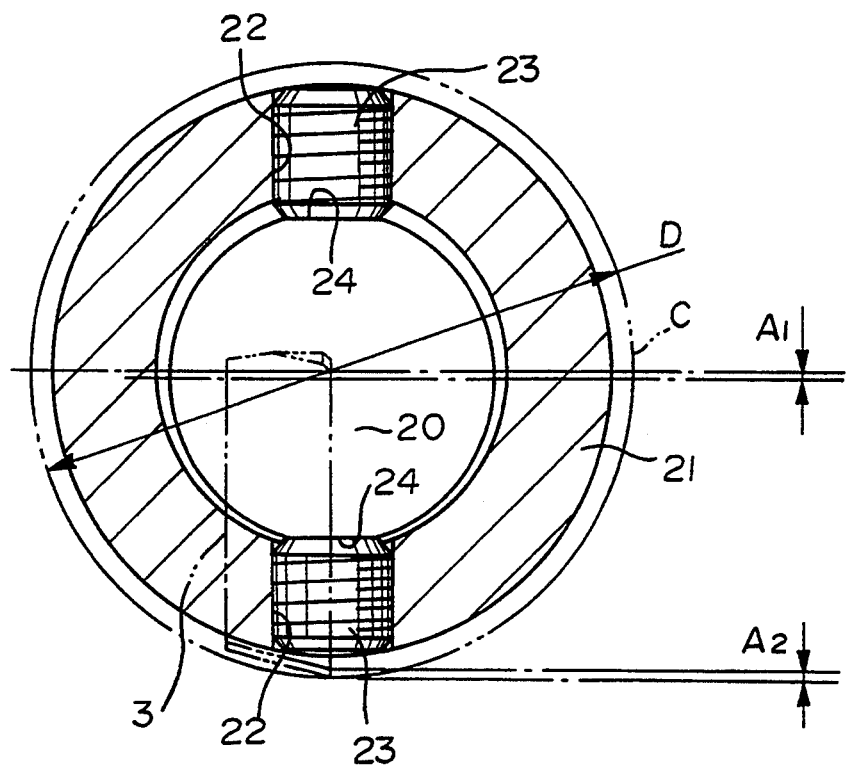
FIG. 5 is a cross-sectional view of a part of junction between a head segment and a shaft segment of the cutting tool of FIG. 1 as seen in the radial direction thereof.

Furthermore, a peripheral surface of the engaging projection 20 is chamfered so as to form two flat portions 24. As shown in FIG. 5, these two flat portions 24 are opposed to each other so as to symmetrical with respect to an axis of the engaging projection 20.

The head 2 segment, which is made of a steel, comprises a hemispherical forward end portion and a reward end portion. The forward end is adapted to receive a cutting insert 3 thereon, while a rearward end portion having an engaging hole 21 which is coaxially formed therein so as to be joined with the shank segment 1. The head segment 2 also comprises two internal threads 22 and two clamp screws 23. That is, the internal threads 22 communicate between the engaging hole 21 and the external surroundings through a peripheral surface of the head segment 2, through which the clamp screws 23 are respectively threaded. These internal threads 22 are opposed to each other so as to be symmetrical with respect to an axis of the head segment 2.

In a bottom face of the hole 21, the internal thread 26 is coaxially formed. This internal thread 26 has a diameter smaller than that of hole 21 and is responsible for receiving the clamp bolt 27 penetrated through the shank segment 1.

Referring to FIG. 5, the clamp screws 23 are respectively threaded into each internal thread 22, in which bottom ends of the clamp screws 23 are respectively contacted with the flat portions 24 of the engaging projection 20.

Figure 6:
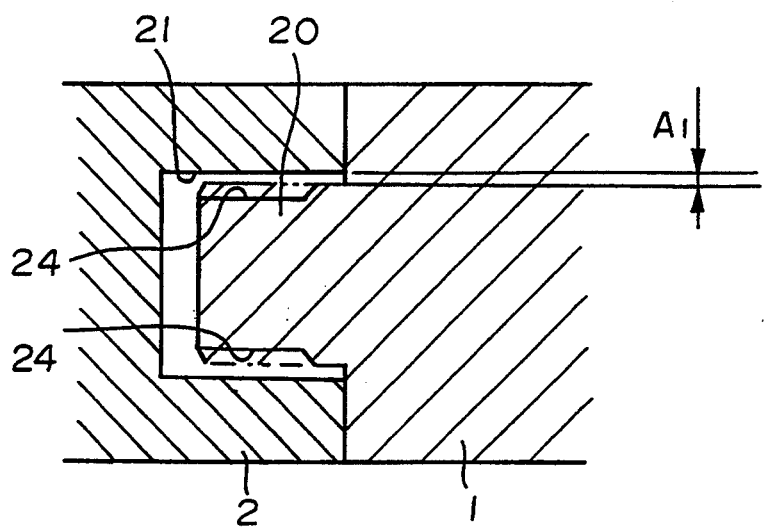
FIG. 6 is a cross-sectional view of a part of junction between a head segment and a shaft segment of the cutting tool of FIG. 1 as seen in the axial direction thereof.

Referring to FIG. 6, there is a gap between a peripheral surface of the engaging projection 20 and a side wall of the hole 21. In a radical direction of the tool, the gap size as indicated by a reference character A1 in the figure is in the range of approximately from 0.01 to 0.04 mm.

In this example, the shank segment 1 and the head segment 2 are joined with each other by following steps:

(i) thrusting the clamp screws 23 loosely into each internal thread 22 of the head segment 2 in such a manner that a bottom portion of the clamp screw 23 is not penetrated from the internal thread 22;

(ii) inserting the engaging projection 20 of the shank segment 1 into the engaging hole 21 of the head segment 2;

(iii) inserting the clamp bolt 27 into the through hole 25 of the shank segment 1 and temporary tighten with the head segment 2;

(iv) radially positioning the engaging projection 20 in the engaging hole 21 by means of the clamp screws 23, for example tightening one clamp screw and loosening other screw to change the relative position of the head segment 2 and the shank segment 1; and (iv) tightly threading the clamp bolt 27 into the internal thread 26 of the head segment 2 to obtain a cutting tool.

In the obtained cutting tool, the trajectory of the cutting edge is a circle as indicated by alternating long and short dash line C in FIG. 5. This circle has a diameter of D which can be varied in the range of A2 (=A1) by means of changing the relative radial position of the above segments 1 and 2 which can be determined by tightening or loosing of the clamp screws 23.

Accordingly, it is preferable that the clamp screws 23 and the clamp bolt 27 are alternately tightened to same extent in several times for positioning the cutting edge with a high accuracy.

In this example, the cutting insert 3 has a threaded bore into which a clamp screw 4 is threaded so as to fixedly secured to an insert-receiving recess of the head segment 2. An axis of the clamp screw 23 is parallel to top and bottom surfaces of the cutting insert 3 so that an effect of the cutting resistance against the cutting insert 3 can be reduced.

EXAMPLE 2

Figure 7:
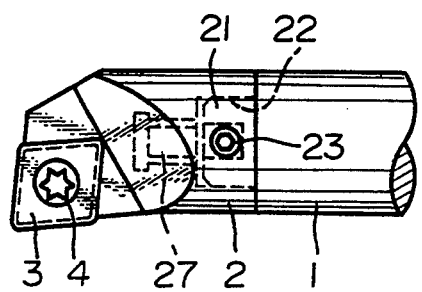
FIG. 7 is a front view of a part of a cutting tool in accordance with the second aspect of the present invention.
Figure 8:
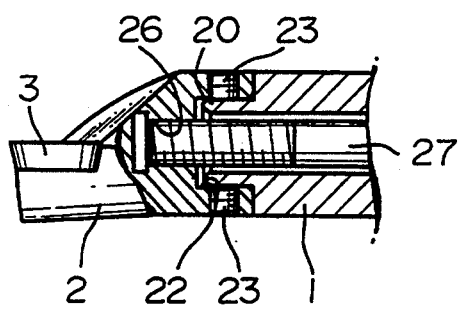
FIG. 8 is a cross-sectional view of the cutting tool of FIG. 7 as seen in the axial direction thereof.
Figure 9:
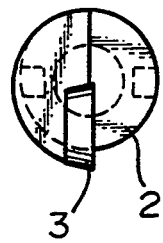
FIG. 9 is an end view of the cutting tool of FIG. 7.

FIGS. 7 to 9 depict a cutting tool in accordance with the present invention which differs from the first example in that an axis of the clamp screw 23 is perpendicular to top and bottom surfaces of the cutting insert 3 for positioning the cutting edge with a high accuracy.

The Examples 1 and 2 can be modified as follows.

(i) The number of the clamp screws for positioning the head and shank segments is not restricted to the number thereof as described above. For example, more than two clamp screws can be used for the positioning.

(ii) The engaging projection can be provided with the head segment, while the engaging hole can be provided with the shank segment.

(iii) The joint means for joining the head and the shank segments is not restricted to the clamp bolt. In the case that the cutting resistance against the cutting edge is small, for example, the head and the shank segments can be joined with each other by tightening the clamp screws.

EXAMPLE 3

FIGS. 10 to 14 depict a cutting tool in accordance with another aspect of the present invention comprising a shank segment 101 and a head segment 102.

The shank segment 101 has two and portions: a forward end portion coaxially provided with an engaging projection 120 adapted to be joined with the head segment 102; and a rearward end portion which is adapted to be fixedly secured to a machine spindle (not shown). The engaging projection 120 is in the form of a general conical frustum. In this example, the shank segment 101 and engaging projection 120 are fabricated in a unitary construction and also they are made of a cemented carbide alloy.

Figure 10:
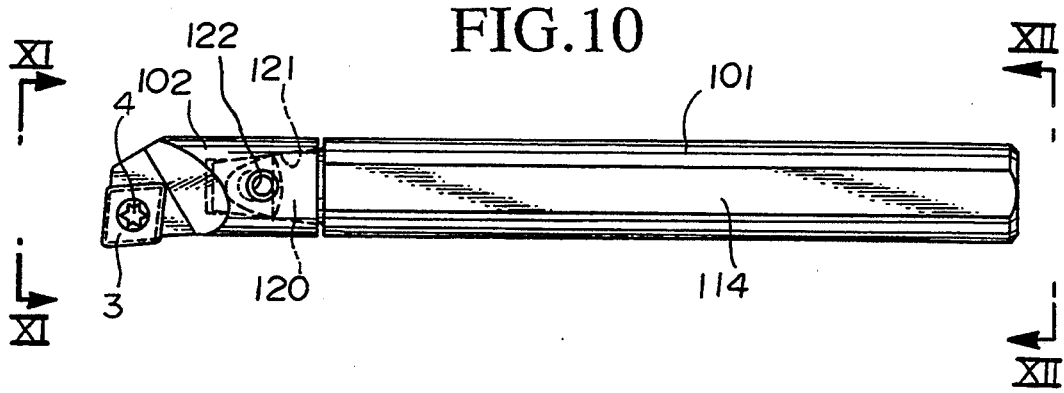
FIG. 10 is a front view of a cutting tool in accordance with an embodiment of the present invention.

Referring to FIG. 10, a peripheral surface of the shank segment 101 has a chamfered portion 114 in the axial direction thereof. This chamfered portion is parallel to a flat portion 124 formed on a peripheral surface of the head segment 102.

The head 102 segment, which is made of a steel, has a forward end portion and a reward end portion. The forward end is adapted to receive a cutting insert 3 thereon, while a rearward end portion is adapted to be joined with the shank segment 101. In addition, an engaging tapered hole 121 is coaxially formed therein.

The head segment 102 also comprises: an internal thread 122 communicating between the hole 121 and the external surroundings through a peripheral surface of the head 102; and a clamp screw 122 threads through the internal thread.

Figure 11:
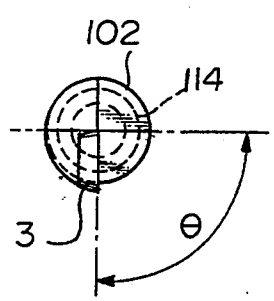
FIG. 11 is an end view of the cutting tool of FIG. 10 as seen in the direction indicated by the arrows XI in FIG. 10.
Figure 12:
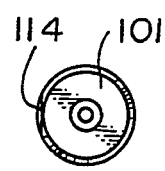
FIG. 12 is an end view of the cutting tool of FIG. 10 as seen in the direction indicated by the arrows XII in FIG. 10.
Figure 13:
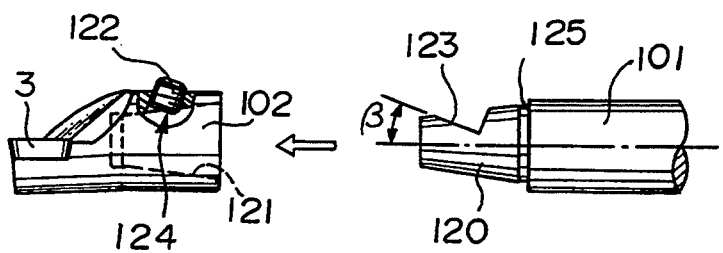
FIG. 13 is an exploded view of the cutting tool of FIG. 10.

FIG. 11 is an end view of the cutting insert of this example. In this figure, a surface of the chamfered portion 114 is peripherally arranged on the shank segment 102 at an angle of $\theta$ with respect to a top end of the cutting insert 3 (in this example, $\theta$ is 90°).

Figure 14:
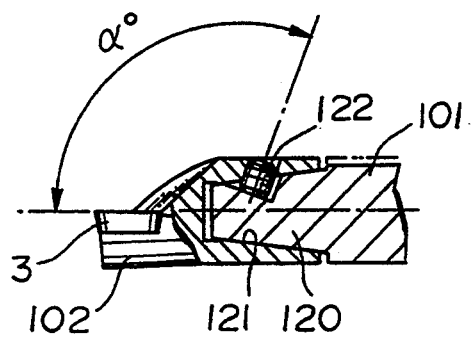
FIG. 14 is an expanded partial sectional view of a part of the cutting tool of FIG. 10.

In addition, the axis of the clamp screw 122 is inclined to the axial direction of the head segment 102 so as to keep a top end of the clamp screw 122 away from the forward end of the head segment 102. In FIG. 14, the inclination of the clamp screw 122 is indicated by a reference character $\alpha$. Also, as shown in the figure, the clamp screw 122 is inclined at an angle of more than 90°. On the other hand, a surface of the flat portion 123 is perpendicular to the axis of the clamp screw 122 and thus it is inclined at an angle of $\beta$ ($\beta = \alpha - 90°$). Consequently, as shown in FIG. 14, a bottom face 124 of the clamp screw 122 can be contacted with the surface of the flat portion 123.

According to the above described construction, the shank segment 101 and the head segment 102 are joined with each other by the following steps:

(i) thrusting a clamp screw 122 loosely into an internal thread 122 of the head segment 102 in such a manner that the bottom face 124 of the clamp screw 122 is not projected from an the internal thread;

(ii) positioning the shank segment 101 and the head segment 102 in the peripheral direction;

(iii) inserting the engaging projection 120 of the shank segment 101 loosely into the engaging hole 121 of the head segment 102; and (iv) tightening the clamp screw 122 into the internal thread so as to touch the bottom face 124 of the clamp screw 122 with a surface of the flat portion 123 of the engaging projection 120.

The shank segment 101 and the head segment 102 are joined with each other in the peripheral direction with a high accuracy by tightening the clamp bolt 127 into the internal thread 126 so as to move the engaging projection 120 toward a bottom face of the engaging hole 121.

In this example, there is an interval portion 125 between the head and the shank segments and thus the cutting tool has a groove at a joint between these segments.

It is noted that the head segment 102 cannot be slipped off from the shank segment 101 because the clamp screw 122 acts as a stopper when the clamp screw 122 is tightened to the head segment 102 at an angle α of over 90°.

EXAMPLE 4

Figure 15:
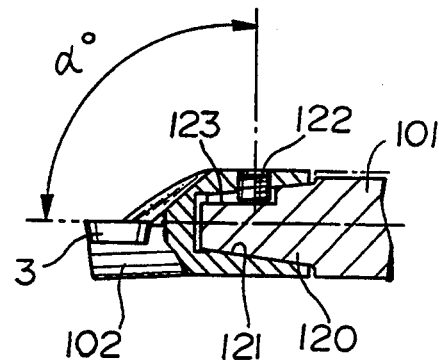
FIG. 15 is a front partial sectional view of a part of a cutting tool in accordance with a modified embodiment of the present invention.

FIG. 15 depicts a cutting tool in accordance with the present invention which differs from the cutting tool of the example 3 in that the clamp screw 122 is arranged at an angle α of 90°.

EXAMPLE 5

Figure 16:
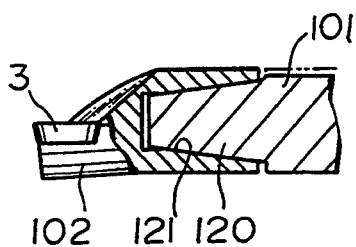
FIG. 16 is a front partial sectional view of a part of a cutting tool in accordance with another modified embodiment of the present invention.

FIG. 16 depicts a cutting tool in accordance with the present invention which differs from the above examples in that the clamp screw 122 and flat portion 123 are not provided.

In this example, the cutting tool comprises: a head segment 102 rotatable around an axis thereof and a forward end portion having a cutting-insert receiving seat and a rearward end portion; and a shank segment 101 rotatable around an axis thereof having a forward end portion adapted to be coaxially joined with the rearward end of the head segment 102 and a rearward end portion adapted to be fixedly secured to a machine spindle (not shown). As shown in the figure, an engaging tapered hole 121 is coaxially formed on the rearward end of the head segment 102, while an engaging tapered projection 120 in the form of a general conical frustum is coaxially formed on the forward end of the shank segment 102 and is engagingly fitted into the engaging tapered hole 121.

Accordingly, this embodiment can be adapted to a cutting tool which does not require positioning of the cutting insert 3 with respect to the shank 101 in the peripheral direction.

EXAMPLE 6

Figure 17:
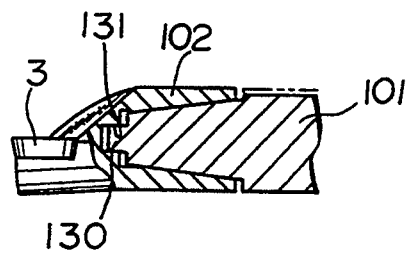
FIG. 17 is a front partial sectional view of a part of a cutting tool in accordance with a further modified embodiment of the present invention.
Figure 18:
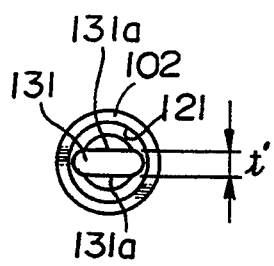
FIG. 18 is a side elevation of a head of the cutting tool of the FIG. 17.
Figure 19:
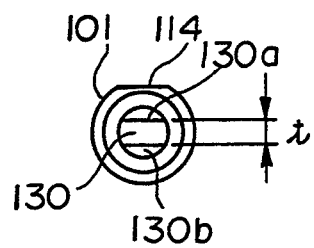
FIG. 19 is a side elevation of a shank of the cutting tool of the FIG. 17.

FIGS. 17 to 19 depict a cutting tool in accordance with the present invention which differs from the above examples in that a plug 130 is coaxially provided with the engaging projection 120, while a recess 131 is formed in a rearward end of the head 102.

The plug 130 is in the form of a flat square and has two wide faces as top and bottom faces 130a, b and narrow faces as side faces having semicircular-shaped forms. In addition, as shown in the FIG. 19, the chamfered portion 114 is parallel to the top and bottom faces 130a, b of the plug 130.

On the other hand, the recess 131 is formed so as to have a width (t') thereof is slightly larger than a width (t) of the plug 130. In addition, a depth of the recess 131 is much larger than a length of the plug 130 because there is no need to restrict the axial movement of the plug 130 in the recess 131.

Accordingly, the plug 130 defines the relative position of a top or bottom surface of the cutting insert 3 at a predetermined angle with respect to a surface of the chamfered portion 114 of the shank segment 101 when the plug is tightly engaged in the recess 131.

EXAMPLE 7

Figure 20:
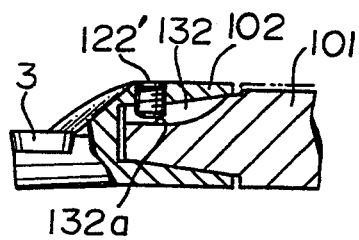
FIG. 20 is a front partial sectional view of a part of a cutting tool in accordance with a still further modified embodiment of the present invention.
Figure 21:
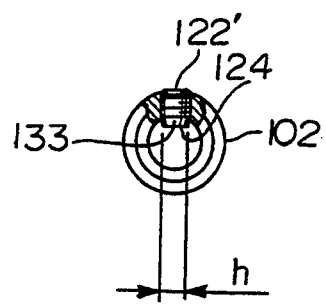
FIG. 21 is a cross-sectional view of the cutting tool of FIG. 20.
Figure 22:
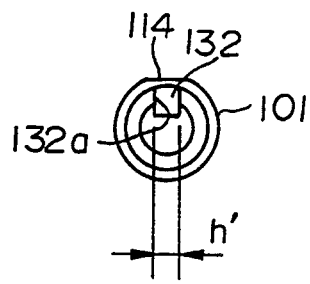
FIG. 22 is another cross-sectional view of the cutting tool of FIG. 20.
Figure 23:
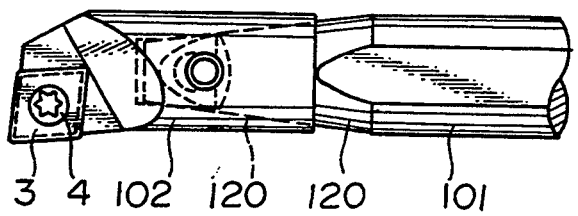
FIG. 23 is a front partial sectional view of a part of a cutting tool in accordance with the eighth example of the present invention.
Figure 24:
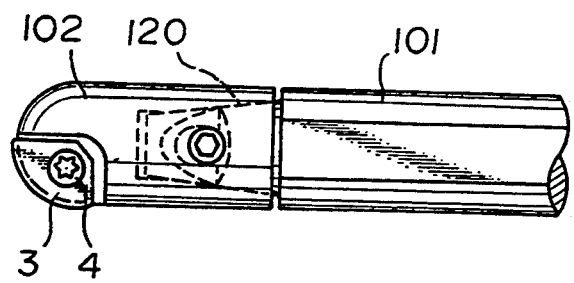
FIG. 24 is a front elevation partly in section of a part of a cutting tool in accordance with the ninth example of the present invention.
Figure 25:
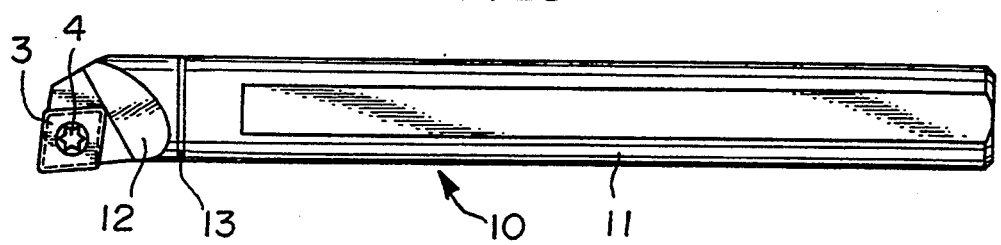
FIG. 25 is a front elevation of a conventional cutting tool.
Figure 26:
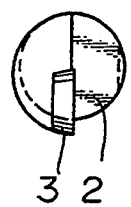
FIG. 26 is an end view of the cutting tool of FIG. 25.
Figure 27:
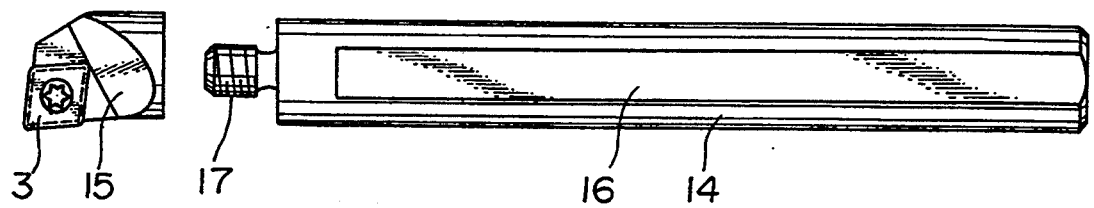
FIG. 27 is a front elevation of another conventional cutting tool.

FIGS. 20 to 22 depict a cutting tool in accordance with the present invention which differs from the above examples in that a different type of clamp screw 122' is provided with the head segment 102 and a grooved portion 132 is formed in a peripheral surface of the engaging projection 120.

In this embodiment, the clamp screw 122' comprises a threaded portion and a protruded portion, which is characterized by that a diameter of the protruded portion 133 is smaller than that of the threaded portion.

The grooved portion 132 is formed so as to have a flat bottom face 132a which is parallel to the chamfered portion 114 and a width (h') which is slightly greater than the diameter (h) of the protruded portion 133 of the clamp screw 122'. Therefore the clamp screw 122' is tightly engaged with the grooved portion 132.

As described above, a cutting tool according to the present invention can be fabricated without using the brazing method or the like for joining the head and shank segments, which can be easily attached and detached from the head segment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A cutting tool comprising:
   a head segment rotatable around an axis thereof having a forward end portion having at least one cutting-insert receiving seat and a rearward end portion;
   a shank segment rotatable around an axis thereof having a forward end portion adapted to be coaxially joined with said rearward end of the head segment and a rearward end portion adapted to be fixedly secured to a machine spindle;
   an engaging hole coaxially formed on one of said segments, which is provided with at least two internal threads communicating between said hole and the external surroundings through a peripheral surface of said segment;
   an engaging projection coaxially formed on other one of said segments and engagingly fitted into said hole;
   clamp screws respectively threaded through each internal thread, in which bottom ends of said clamp screws are contacted with a surface of said engaging projection;

a through hole coaxially formed in said shank segment and said engaging projection;
an internal thread coaxially formed on a bottom face of said engaging hole; and
a clamp bolt coaxially passing through said shank segment and said engaging projection and engagingly fitted into said internal thread.

2. A cutting tool according to claim 1, wherein said shank segment is provided with said engaging projection and is made of a cemented carbide alloy.

3. A cutting tool according to claim 2, wherein said shank segment and said engaging projection are fabricated in a unitary construction.

4. A cutting tool according to one of claims 1 to 3, wherein said internal threads are formed so as to coaxially coincide with each other.

5. A cutting tool according to claim 1, wherein said engaging projection further including flat portions on an outer peripheral surface thereof for respectively receiving said bottom ends of the clamp screws.

6. A cutting tool according to claim 1, 2, 3 or 5 wherein said shank segment further comprises at least one chamfered portion on a peripheral surface thereof.

7. A cutting tool according to claim 1, wherein said cutting tool has a gap between the peripheral surface of said engaging projection and a side wall of said hole in a radial direction of said cutting tool.

8. A cutting tool according to claim 7, wherein said gap is in the range of from 0.01 to 0.04 mm.

9. A cutting tool according to claim 4 wherein said shank segment further comprises at least one chamfered portion on a peripheral surface thereof.

* * * * *